United States Patent [19]
VannRox et al.

[11] Patent Number: 5,694,112
[45] Date of Patent: Dec. 2, 1997

[54] SOLID STATE ROTARY APPARENT BEACON

[75] Inventors: Robert S. VannRox, Hattiesburg, Miss.; Bruce Scott Rigsby, Charlestown; Troy Lynn Roney, Madison, both of Ind.

[73] Assignee: Grote Industries, Inc., Madison, Ind.

[21] Appl. No.: 353,899

[22] Filed: Dec. 12, 1994
(Under 37 CFR 1.47)

[51] Int. Cl.$^6$ .................................................. B60Q 1/52
[52] U.S. Cl. ..................... 340/472; 340/468; 340/471; 340/478
[58] Field of Search ....................... 340/468, 471, 340/472, 478, 981, 983; 362/74

[56] References Cited

U.S. PATENT DOCUMENTS

| | | | |
|---|---|---|---|
| 2,179,899 | 11/1939 | Hall | 340/478 |
| 2,938,192 | 5/1960 | Adler, Jr. | 340/981 |
| 3,551,676 | 12/1970 | Runnels | 340/961 |
| 3,764,799 | 10/1973 | Schulz | 340/472 |
| 4,357,595 | 11/1982 | Gosswiller | 340/472 |
| 4,527,158 | 7/1985 | Runnels | 340/961 |
| 4,621,253 | 11/1986 | Pillinger et al. | 340/472 |

*Primary Examiner*—Jeffery Hofsass
*Assistant Examiner*—Julie B. Lieu
*Attorney, Agent, or Firm*—Woodard, Emhardt, Naughton, Moriarty & McNett

[57] ABSTRACT

A completely solid state rotary beacon which produces a rotary beacon lighting effect without the use of mechanical components or rotating parts. The device of the present invention includes a plurality of light sources which are equicircumferentially spaced around the outer perimeter of the rotary beacon. These light sources are intermittently illuminated by an electronic controller in such a fashion that the illusion of a rotating light beacon is produced without the need for rotating mechanical components. The lighting sequence, in conjunction with the unique parabolic reflector arrangement of the present invention, create the illusion of a light source being rotated in a 360° path. This effect is achieved by the present invention without the use of rotating mechanical components.

8 Claims, 5 Drawing Sheets

– BULB –

| Time | A | B | C | D | E | F |
|---|---|---|---|---|---|---|
| Start | ON | | | | | |
| 1 | ON | ON | | | | |
| 2 | | ON | ON | | | |
| 3 | | | ON | ON | | |
| 4 | | | | ON | ON | |
| 5 | | | | | ON | ON |
| 6 | ON | | | | | ON |

SOLID STATE ROTARY APPARENT BEACON

TECHNICAL FIELD OF THE INVENTION

The present invention relates to rotary beacons for use in emergency equipment and, more particularly to a solid state rotary beacon.

BACKGROUND OF THE INVENTION

High intensity beacons are often used to unequivocally signal emergency situations. The most frequent use occurs when these beacons are mounted upon emergency vehicles such as police cars or ambulances. A conventional rotary beacon includes at least one, and generally two electrically powered lights that are mounted for rotation on a base of the beacon. The lights in the base are sealed in a cover which is transparent or translucent, the cover being referred to in the art as a "dome". Although there are many types of rotary beacons, a typical rotary beacon includes a base that supports an electrical light housing for rotation with respect to the base. The light housing rotates on a central spindle secured to the base. The housing with the light secured thereto rotates at a relatively high speed, for example approximately 60 r.p.m. Alternatively, the rotary beacon may be constructed with a fixed light source and a parabolic surface which rotates 360° around the light source, thereby achieving the rotary beacon effect.

The rotary beacons of the prior art suffer from numerous undesirable problems. First electric commutating connections which are required by the rotating light sources eventually wear or corrode and cause intermittent and unreliable connections. Also, the prior art designs are generally large mechanical devices which require a large profile on the top of the emergency vehicle. Furthermore, these large, bulky mechanical assemblies are difficult and expensive to assemble. Finally, the need for a mechanical motor in the prior art devices causes electromagnetic (EMI) interference which is incompatible with the sophisticated computing and communications equipment which is now found in most emergency vehicles.

There is therefore a need in the prior art for a rotary beacon which does not include rotating mechanical components, that exhibits a relatively small profile, that does not produce electromagnetic interference, and which has a low cost of material and assembly, thereby reducing the overall cost of the rotary beacon. Furthermore, any new rotary beacon design must produce the familiar rotary panning light pattern generated by the prior art devices. The present invention is directed towards meeting these needs.

SUMMARY OF THE INVENTION

The present invention is directed toward a completely solid state rotary beacon which produces a rotary beacon lighting effect without the use of mechanical components or rotating parts. The device of the present invention includes a plurality of light sources which are equicircumferentially spaced around the outer perimeter of the rotary beacon. These light sources are intermittently illuminated by an electronic controller in such a fashion that the illusion of a rotating light beacon is produced without the need for rotating mechanical components. The lighting sequence, in conjunction with the unique parabolic reflector arrangement of the present invention, create the illusion of a light source being rotated in a 360° path. This effect is achieved by the present invention without the use of rotating mechanical components.

In one form of the invention a rotary beacon is disclosed, comprising a plurality of light sources substantially equally spaced around a circumference; and a controller coupled to the plurality of light sources and operable to sequentially illuminate the plurality of light sources in a walking pattern.

In another form of the invention a rotary beacon is disclosed, comprising plural means for illumination substantially equally spaced around a circumference; and means for controlling coupled to the plural means for illumination and operable to sequentially illuminate the plural means for illumination in a walking pattern.

In another form of the invention an emergency vehicle system is disclosed, comprising a motorized emergency vehicle, such as an ambulance, fire truck, police vehicle, or the like; a rotary apparent beacon mounted on the emergency vehicle the rotary beacon comprising a plurality of light sources substantially equally spaced around a circumference and mounted in a fixed position with respect to said vehicle; and an electronic controller coupled to the plurality of light sources and operable to sequentially illuminate the plurality of light sources in an apparent rotary light beacon.

DESCRIPTION OF THE PREFERRED EMBODIMENT

Figure 1:
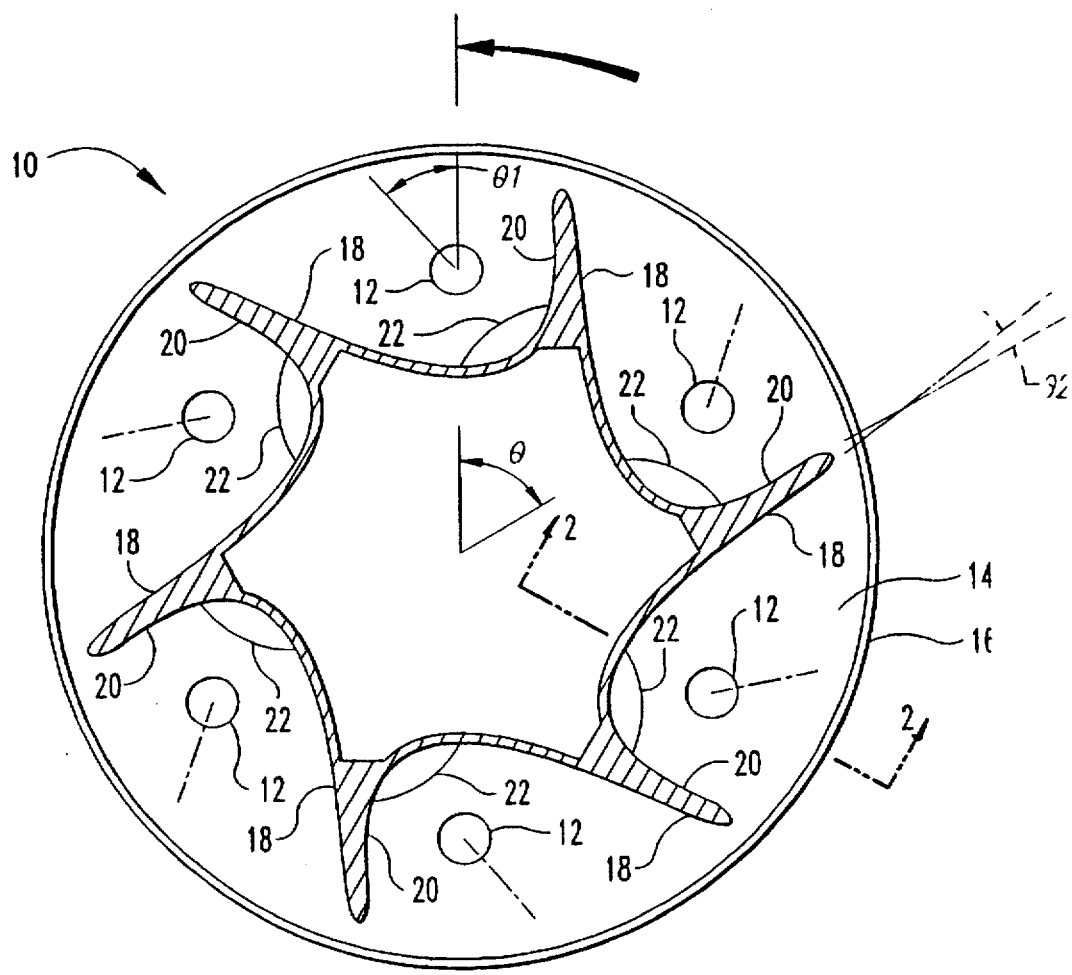
FIG. 1 is a top cut-away view of a first embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention is directed toward a completely solid state rotary beacon which produces a rotary beacon lighting effect without the use of mechanical components or rotating parts. The device of the present invention includes a plurality of light sources which are equicircumferentially spaced around the outer perimeter of the rotary beacon. These light sources are intermittently illuminated by an electronic controller in such a fashion that the illusion of a rotating light beacon is produced without the need for rotating mechanical components. An important aspect of the present invention is that the plurality of lights do not merely illuminate in sequence around the perimeter of the rotary beacon. Rather, the lighting sequence, in conjunction with the unique parabolic reflector arrangement of the present invention, create the illusion of a light source being rotated in a 360° path. This effect is achieved by the present invention without the use of rotating mechanical components.

Referring to FIG. 1, the solid state rotary beacon of the present invention is illustrated in a top plan view and is indicated generally at 10. The rotary beacon 10 uses a plurality of light sources 12 in order to produce a pannable light beam. The first embodiment of the present invention illustrated in FIG. 1 uses six such light sources 12, however those skilled in the art will appreciate that a greater or lesser number of light sources may be used, depending on the individual application. It is preferred that at least five such light sources are used. The light sources 12 are preferably halogen lamps but may be light emitting diodes (LEDs), incandescent light bulbs, or any other satisfactory source of illumination. The light sources 12 are preferably equally spaced around the circumference of the rotary beacon base 14. An angle φ is circumscribed between each successive light source 12. The angle φ will be equal to 360° divided by the total number of light sources 12 used in the rotary beacon 10. The entire rotary beacon assembly 10 is covered with a transparent dome or lens 16 which is mated with the base 14 at the circumference thereof. It is important that sufficient space be allowed between each of the light sources 12 and the interior surface of the lens 16 because of heat management concerns. The light sources 12 may be installed through the bottom of base 14 (see FIG. 2) or through an access zone in the parabolic surface (not shown).

If the light sources 12 were placed in the position shown in FIG. 1 and merely sequenced in continuous order, the effect would be of a light source moving around the perimeter of the rotary beacon 10, rather than the effect of a single light source rotating about the central axis of the rotary beacon 10. The present invention creates such a rotating illusion by providing a compound parabolic surface to reflect each of the light sources 12 and by sequencing the light sources 12 in a walking pattern. Each of the light sources 12 has an associated leading parabolic surface 18 which is the primary reflective surface for the light source 12. Rather than being oriented radially from the center of the base 14, the leading parabolic surface 18 is oriented at an angle θ1. Thus, the angle θ1 provides a parabolic modified light pattern that is focused outward from the device 10 at a given angle from the radial direction. The orientation of the angle θ1 is dependent upon the light source 12 location on the base 14, and hence its location with reference to leading parabolic surface 18.

Each light source 12 of the rotary beacon 10 further includes a trailing parabolic surface 20 which is the secondary reflective surface for each light source 12. The trailing parabolic surface 20 is oriented such that the light from light source 12 which is reflected by this surface overlaps the light from an adjacent light source 12 reflected by its associated leading parabolic surface 18. The angle of overlap between the two reflected light beams is indicated in FIG. 1 as the angle θ2. This angle of overlap θ2 is an area where reflected light from adjacent light sources 12 meet and combine.

A major problem with prior art devices which utilize light sources in parabolic reflective surfaces is that "hot spots" are observed when such devices are in operation. The present invention reduces or eliminates such hot spots by utilizing a blending radius or elliptical cylinder section 22 directly behind the light source 12, centered on the axis established by the angle θ1. Such an elliptical cylindrical section 22 spreads the light from the hot spot so that the overall light intensity is evenly blended through the light arc projection. Use of the angle of overlap θ2 and the blending radius produced by the elliptical cylinder 22 ultimately reduces or eliminates all hot spots and dwell points in the rotary beacon of the present invention.

Figure 2:
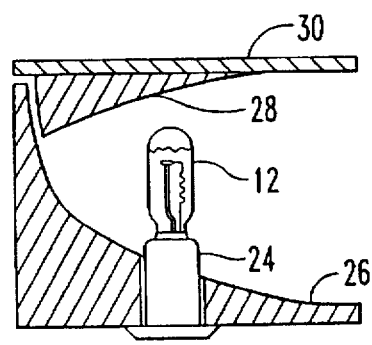
FIG. 2 is a partial cross-sectional view of the first embodiment device of FIG. 1 taken at section 2—2.
Figure 7:
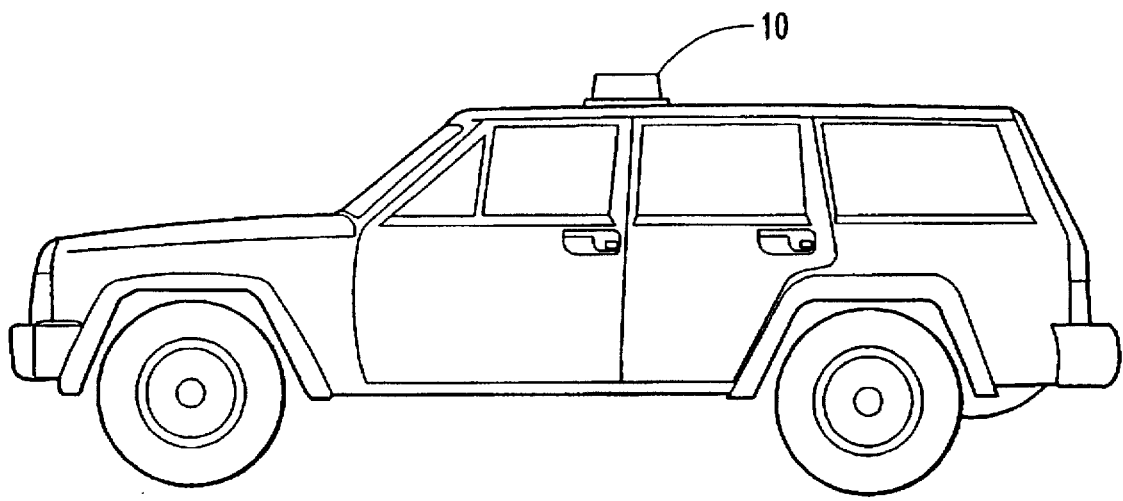
FIG. 7 is the solid state rotary apparent beacon of the present invention mounted atop an emergency vehicle.

Referring now to FIG. 2, the rotary beacon 10 of FIG. 1 is seen in a partial cross-section. The light source 12 can be seen mounted in a socket 24 which is mounted to the device 10 through the bottom of the base 14. The area below the light source 12 includes a bottom reflective surface 26 which is used to reflect light from below the light source 12 in an outward direction. Likewise, an upper reflective surface 28 reflects light from above the light source 12 in an outward direction. The upper reflective surface 28 is attached to the underside of a lid 30 which fits onto the top of rotary beacon 10 and mates with the top edge of the lens 16. It will be appreciated by those skilled in the art that the leading parabolic surface 18, trailing parabolic surface 20, elliptical cylinder blending radius 22, bottom reflective surface 26, and upper reflective surface 28 all combine to form a compound reflective surface for each of the light sources 12. The entire structure is enclosed in a weather proof enclosure (see FIG. 7).

Figures 3, 4:
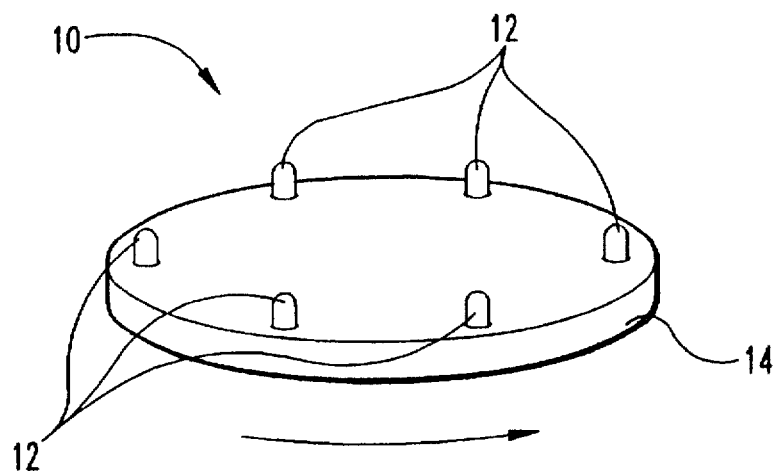
FIG. 3 is a perspective schematic view of the base and lights of the first embodiment of the present invention.
FIG. 4 is a logic table showing a preferred sequence of illumination of the lights of the device of FIG. 3.

Referring now to FIG. 3, the rotary beacon 10 of FIG. 1 is illustrated in a perspective schematic view without the lens 16, parabolic surfaces or the lid 30 engaged. The light sources 12 are lettered A–F for reference. It is desired that the light sources 12A–F be illuminated in sequence in order to create the illusion of a single light source rotating in a counter-clockwise direction. The illumination sequence necessary to create such a rotary illusion is illustrated in tabular form in FIG. 4. In order to create the illusion of a rotating light source, the light sources 12A–F have to be sequenced in a manner that the radiated light output not only makes a 360° arc of rotation, but also in such a way that there is 100% coverage of all points in that arc with light (i.e. such that there are no dwell points of minimum light anywhere within the 360° arc). To accomplish this effect, the device utilizes a light sequence pattern that consists of a "walking" light pattern where at any given time two of the bulbs 12A–F are illuminated at once. Such a walking sequence is illustrated in the table of FIG. 4. The unlabeled boxes in the table represent times when the indicated light sources 12 are not illuminated. The sequence illustrated in FIG. 4 covers one 360° rotation. The sequence of FIG. 4 is therefore continuously repeated in order to create the effect of a continuously rotating light source.

As the table of FIG. 4 clearly demonstrates, at any one time two adjacent light sources 12 are illuminated on the rotary beacon 10. Because of the angle of overlap θ2 which is designed into the reflecting surfaces of the light sources 12, the illumination of two adjacent light sources 12 creates a continuous, uninterrupted arc of light. Because the next light source 12 in sequence is illuminated at the same time that the trailing light source 12 is extinguished, the light source 12 between these two is constantly illuminated. Therefore there is never a time when no light sources 12 are illuminated. When this is combined with the angle of overlap θ2 which blends the light arcs produced by adjacent light sources 12, the effect is one continuous panning sweep of light which progresses around the circumference of the rotary beacon 10, exactly like the sweep of light that would be produced by a single rotating light source in the middle of the rotary beacon 10. Without the angle of overlap θ2 produced by the reflective surfaces of the rotary beacon 10, the sequential illumination of the light sources 12 would produce a running, marquee effect rather than a rotating light effect. Other non-walking patterns are also possible. Moreover, multiple continuous panning sweeps of light are possible by having lights diametrically across the circumference from each other simultaneously turned on.

Figure 5:
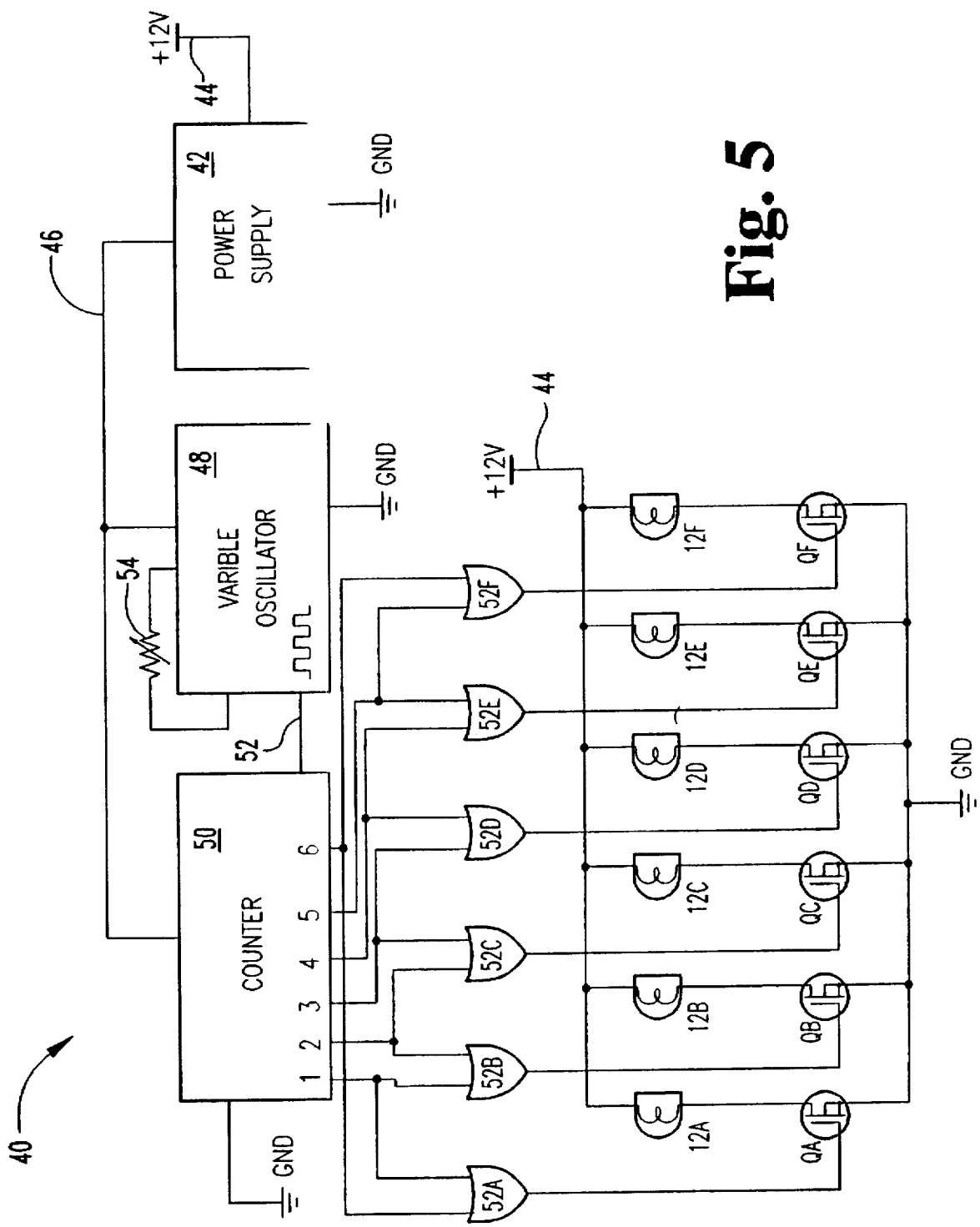
FIG. 5 is an electrical schematic diagram of a first embodiment electrical circuit of the present invention.

Referring to. FIG. 5, a first embodiment example of an electrical circuit for producing the walking sequence in the light sources 12A–F is illustrated in schematic form and indicated generally at 40. A voltage regulator power supply 42 transforms 12V input voltage 44 into a lower voltage $V_{cc}$ at output port 46. A 12V supply voltage 44 is used in the preferred embodiment because it is conveniently available from the vehicle battery. Those skilled in the art, however, will appreciate that any suitable supply voltage may be used. The voltage $V_{cc}$ is preferably +5V. $V_{cc}$ line 46 is used to provide power to a variable oscillator 48 as well as a counting circuit 50. Variable oscillator 48 produces a series of clock output pulses on the line 52, which is used as an input to the counter circuit 50. Variable oscillator 48 includes a potentiometer 54 which allows adjustment of the frequency of the pulse train produced at the output 52. Counter circuit 50 sequentially enables the outputs 1, 2, 3, 4, 5 and 6 at a frequency related to the frequency of the pulse train on line 52. The outputs 1–6 of counter circuit 50 form inputs to the driver circuitry which is used to sequentially illuminate the light sources 12A–F.

The outputs 1–6 of counter circuit 50 are coupled to the inputs of OR gates 52A–F in the manner shown in FIG. 5. The outputs of OR gates 52A–F are used to drive the gates of respective field effect transistors (FET) QA–QF. The drain-to-source path of each of the FETs QA–QF is connected in series with a respective light source 12A–F between the 12 volt voltage source 44 and ground. Referring to light source 12A as an illustrative example, when the output of OR gate 52A is low (which occurs whenever neither of its inputs is high), a low signal is present of the gate of transistor QA and the transistor is therefore turned off. When the transistor QA is turned off, no current can conduct between the drain and source thereof, therefore no current may conduct through the light source 12A and it is not illuminated. However, when the output of OR gate 52A goes high (which occurs any time one or both of its inputs is high), a high voltage is applied to the gate of transistor QA, causing current to conduct between the drain and source of transistor QA. This draws current through the light source 12A, which is thereby illuminated. The driver circuits for the remaining light sources 12B–F work in identical fashion. It will be appreciated by those skilled in the art that the sequential enabling of the outputs 1–6 of counter 50 produce a sequence of illumination of the light sources 12A–F identical to that shown in the table in FIG. 4. Therefore, when the light sources 12A–F are placed within the rotary beacon assembly 10 of FIG. 1 and operated with the electronic driving circuitry 40 of FIG. 5, the illusion of a single rotating lamp is created in the rotary beacon 10.

Figure 6:
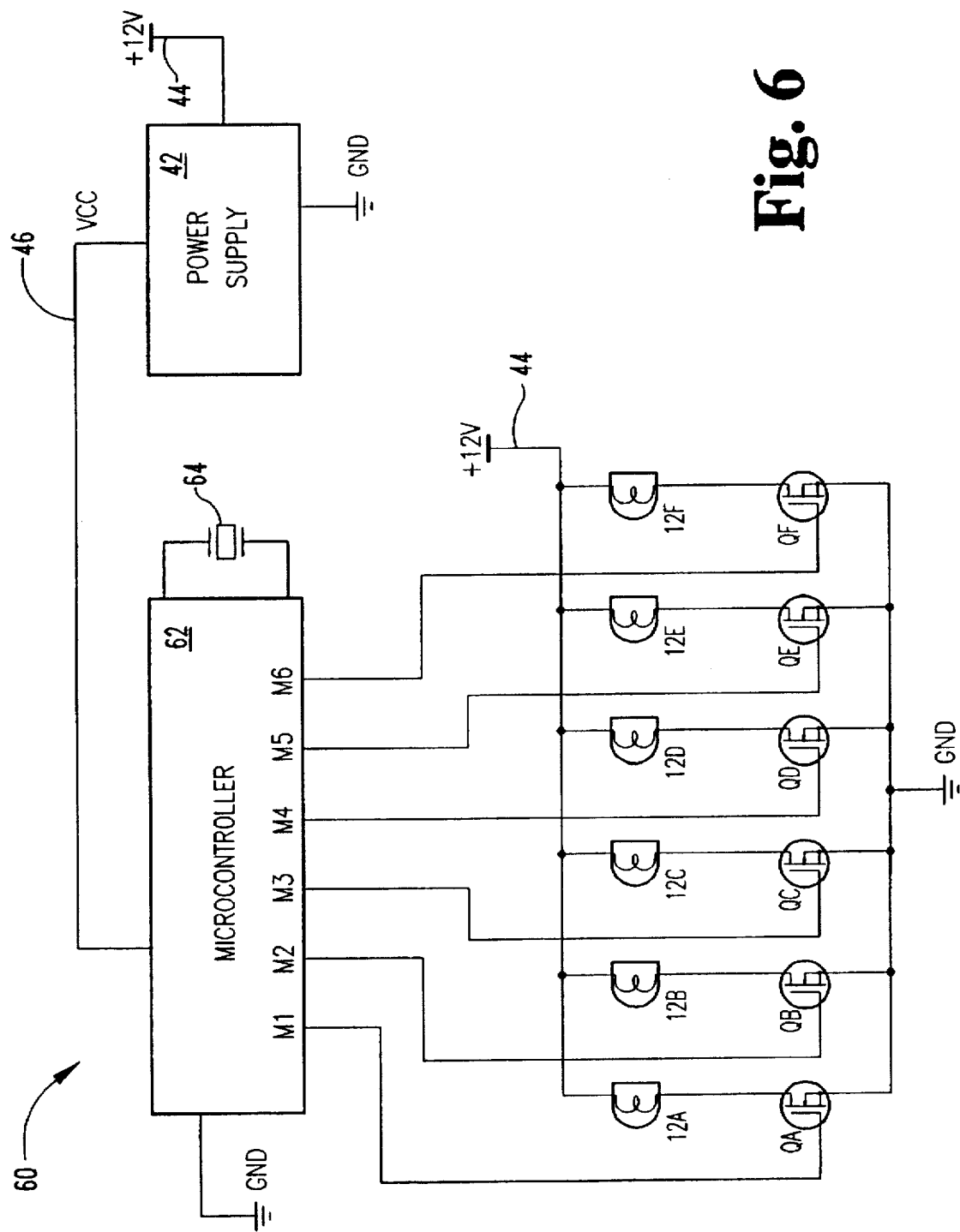
FIG. 6 is an electrical schematic diagram of a second embodiment electrical circuit of the present invention.

Referring now to FIG. 6, a second embodiment electrical driving circuit of the present invention is illustrated and indicated generally at 60. The driver circuit 60 replaces the variable oscillator/counter/OR gate circuitry of the driver 40 with a microcontroller 62. Microcontroller 62 is powered by the $V_{cc}$ voltage 46 produced by power supply 42. A clocking signal for microcontroller 62 is provided by an external crystal 64 attached thereto. Microcontroller 62 may be any processing device including associated memory which is capable of executing a sequence of stored instructions, as is known in the art. Microcontroller 62 may be integrated on a single silicon chip or, in the alternative, may be formed from several discreet components. Microcontroller 62 has a program stored in its associated memory which contains instructions which are executed in sequence by the microcontroller 62. The rate at which these program instructions are executed is determined by the frequency of external crystal 64. In a preferred embodiment, the program stored within microcontroller 62 causes the microcontroller to enable each of the outputs M1–M6 in a walking sequence as shown in the table of FIG. 4. Each of the outputs M1–M6 is tied to the gate of the respective drive transistor QA–QF, respectively. The drive circuitry is used to illuminate the light sources 12A–F in an analogous manner to that described for the circuit 40 of FIG. 5, creating the illusion of a single rotating lamp.

The use of the microcontroller 62 has certain advantages over the use of the circuitry 40 of FIG. 5. For example, the microcontroller may be programmed to sequence the light sources 12A–F in any order, including clockwise rotation and/or counter-clockwise rotation. For example, counter-clockwise rotation is produced by sequentially enabling the outputs M1–M6 in that order in a walking pattern. Conversely, clockwise rotation is produced by sequentially enabling the outputs in the order M6, M5, M4, M3, M2 and M1 in a sequential walking pattern. The electronic control circuitry 60 of FIG. 6 could therefore be used to cause the rotary beacon 10 of FIG. 1 to appear to rotate in either a clockwise or a counter-clockwise direction depending upon the setting of a switch (not shown) which provides an input signal to the microcontroller 62. Such a switch could be located within the interior of the emergency vehicle. Additionally, the microcontroller 62 may be programmed to cause the light sources 12A–F to appear to execute one clockwise rotation followed by one counter-clockwise rotation, repeating this sequence indefinitely. Unlike prior art mechanical rotary beacons, the change in apparent rotational direction may be, accomplished without any change in apparent rotational velocity. Furthermore, the microcontroller 62 may be used to create the illusion of rotating back-to-back lights by simultaneously illuminating diametrically opposed light sources 12A–F. It will be appreciated by those skilled in the art that the programming flexibility of the microcontroller 62 allows an almost infinite variety of light sequences to be executed by the rotary beacon 10.

With the use of either control circuit 40 or 60, the present invention contemplates the incorporation of at least an on/off switch accessible to the driver of the vehicle for activation or deactivation of the rotary beacon. Further controls for altering the performance of the rotary beacon may also be placed within reach of the driver. Many such additional controls will be apparent to those skilled in the art in light of the present disclosure and, when used in conjunction with the novel elements claimed herein, comprise a part of the present invention.

The rotary beacon of the present invention has a large number of advantages over prior art mechanical beacons. Because the rotary-beacon 10 is solid state and has no moving parts, it is more reliable than the rotating mechanical devices of the prior art. Furthermore, because the present invention does not require large, bulky mechanical devices to generate bulb rotation, it may be made smaller and with a "flatter" profile than the devices of the prior art. Due to the nature of the design of the present invention, assembly of the device is much easier than is the case with the prior art mechanical device, and the component count is smaller and less expensive. Thus, the cost of components and assembly labor are greatly reduced in comparison to the prior art device. Because the rotary beacon of the present invention does not need a mechanical motor for rotation, EMI problems are greatly reduced and in most cases eliminated. Finally, the use of the programmable driver circuitry 60 of FIG. 6 allows the programming of a wide variety of sequence patterns in the rotary beacon 10 of the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A rotary apparent beacon, comprising:

a plurality of at least five light sources fixedly mounted to a housing and spaced around a circumference:

a controller coupled to the plurality of light sources and operable to sequentially illuminate the plurality of light sources in a walking pattern to create an apparent rotary beacon light effect; and a plurality of reflectors respectively associated with the light sources;

wherein the reflectors include a leading generally surface operative angularly displaced from a radial direction of the circumference.

2. The rotary apparent beacon of claim 1, wherein the plurality of reflectors further include a trailing generally parabolic surface operative to reflect light from the associated light source substantially in a second direction angularly displaced from the radial direction of the circumference, such that light reflected by the trailing parabolic surface associated with a first one of the plurality of light sources partially overlaps light reflected by the leading parabolic surface associated with a second one of plurality of light sources, the first and second light sources being circumferentially adjacent.

3. The rotary apparent beacon of claim 1, wherein each of the plurality of reflectors includes a bottom reflective surface operative to reflect light from below the associated light source substantially in the radial direction of the circumference.

4. The rotary apparent beacon of claim 1, wherein each of the plurality of reflectors includes a top reflective surface operative to reflect light from above the associated light source substantially in the radial direction of the circumference.

5. A rotary apparent beacon, comprising:

a plurality of at least five light sources fixedly mounted to a housing and spaced around a circumference;

a controller coupled to the plurality of light sources and operable to sequentially illuminate the plurality of light sources in a walking pattern to create an apparent rotary beacon light effect; and a plurality of reflectors respectively associated with the light sources;

wherein the reflectors include a leading generally parabolic surface operative to reflect light from the associated light source substantially in a first direction angularly displaced from a radial direction of the circumference; and wherein each of the plurality of reflectors includes a blending radius surface located on an axis defined by the first direction and operative to cause the reflected light to be of substantially equal intensity at all points in the reflected light beam equidistant from the associated light source.

6. The rotary apparent beacon of claim 5, wherein the blending radius surface comprises an elliptical cylindrical section.

7. A rotary apparent beacon comprising:

a plurality of at least five light sources fixedly mounted to a housing and spaced around a circumference;

a contoller coupled to the plurality of light sources and operable to sequentially illuminate the plurality of light sources in a walking pattern to create an apparent rotary beacon light effect; and a plurality of reflectors, each of the plurality of reflectors being associated with one of the plurality of light sources;

wherein each of the plurality of reflectors is operative to produce a reflected beam such that the reflected beam of circumferentially adjacent light sources partially overlap.

8. A rotary apparent beacon, comprising:

plural means for illumination substantially equally spaced around a circumference;

means for controlling coupled to the plural means for illumination and operable to sequentially illuminate the plural means for illumination in a walking pattern;

wherein illumination from the plural means for illumination is directed in a substantially radial direction;

plural means for reflecting, each of the plural means for reflecting being associated with one of the plural means for illumination;

wherein each of the plural means for reflecting includes a leading parabolic surface means for reflecting light from the associated means for illumination substantially in a first direction angularly displaced from a radial direction of the circumference.

* * * * *